United States Patent
Struschka et al.

(10) Patent No.: US 6,203,022 B1
(45) Date of Patent: *Mar. 20, 2001

(54) ANNULAR SEALING ELEMENT

(75) Inventors: Martin Struschka, Lahnstein; Ulrich Beier, Northeim, both of (DE)

(73) Assignees: Lucas Industries public limited, West Midlands (GB); Contitech Forteile GmbH, Northeim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,208

(22) Filed: Aug. 21, 1998

(30) Foreign Application Priority Data

Apr. 17, 1996 (DE) ............................................. 196 15 157
Apr. 17, 1997 (WO) .................................. PCT/EP97/01927

(51) Int. Cl.[7] ...................................................... F16J 9/08
(52) U.S. Cl. .......................... 277/572; 277/437; 277/560; 60/589; 92/165 R
(58) Field of Search .................................... 277/436, 437, 277/438, 439, 560, 572, 909, 648, 612, 640, 651; 60/589; 92/165 R

(56) References Cited

U.S. PATENT DOCUMENTS

| 876,977 | 1/1908 | Larson . | |
|---|---|---|---|
| 2,750,214 | * 6/1956 | Bermingham | 277/572 |
| 3,282,594 | 11/1966 | Wheeler . | |
| 3,419,280 | * 12/1968 | Wheeler | 277/123 |
| 4,281,590 | 8/1981 | Weaver . | |
| 5,480,163 | * 1/1996 | Miser et al. | 277/437 |

FOREIGN PATENT DOCUMENTS

| 335243 | 2/1977 | (AT) . |
|---|---|---|
| 4225556C2 | 5/1995 | (DE) . |
| 19505115A1 | 8/1996 | (DE) . |
| 0467021A1 | 1/1992 | (EP) . |
| 0519533A1 | 12/1992 | (EP) . |
| 2256687A | 12/1992 | (GB) . |

OTHER PUBLICATIONS

European Patent Office, *PCT International Search Report*, Copy of Search Report of Parent Application PCT/EP97/01927.

* cited by examiner

*Primary Examiner*—Anthony Knight
*Assistant Examiner*—Enoch E Peavey
(74) *Attorney, Agent, or Firm*—Wood, Herron and Evans, L.L.P.

(57) ABSTRACT

An annular sealing element (16) for sealing an annular gap between the inner surface of a cylindrical wall and a cylindrical piston which can be displaced axially relative to said wall and is arranged concentrically therewith, has two separate annular and axially adjoining parts (42, 44), of which the first part (42) consists of an elastomer material and the second part (44) consists of a rigid material. In order to ensure, in conjunction with a displaceable body of a valve, that the opening and closing behavior of the valve is as constant as possible, the two parts (42, 44) are connected to one another in a releasable manner, and the part (44) made of rigid material has an axial protrusion (46) which is formed integrally with it, runs around it in the form of a ring, passes more or less to the full extent through the part (42) made of elastomer material and has its end surface covered over to the full extent by the part (42) made of elastomer material. The axial protrusion (46), which runs around in the form of a ring, is designed and arranged such that a radial wall thickness $S_i$ of the part (42) made of elastomer material, on the radially inner flank of said protrusion, is approximately equal to a radial wall thickness $S_a$ on the radially outer flank of said protrusion. The radial extent S of the protrusion (46) is not more than 70% of the sum of the wall thicknesses $S_i + S_a$.

9 Claims, 2 Drawing Sheets

ANNULAR SEALING ELEMENT

TECHNICAL FIELD

Figure 1:
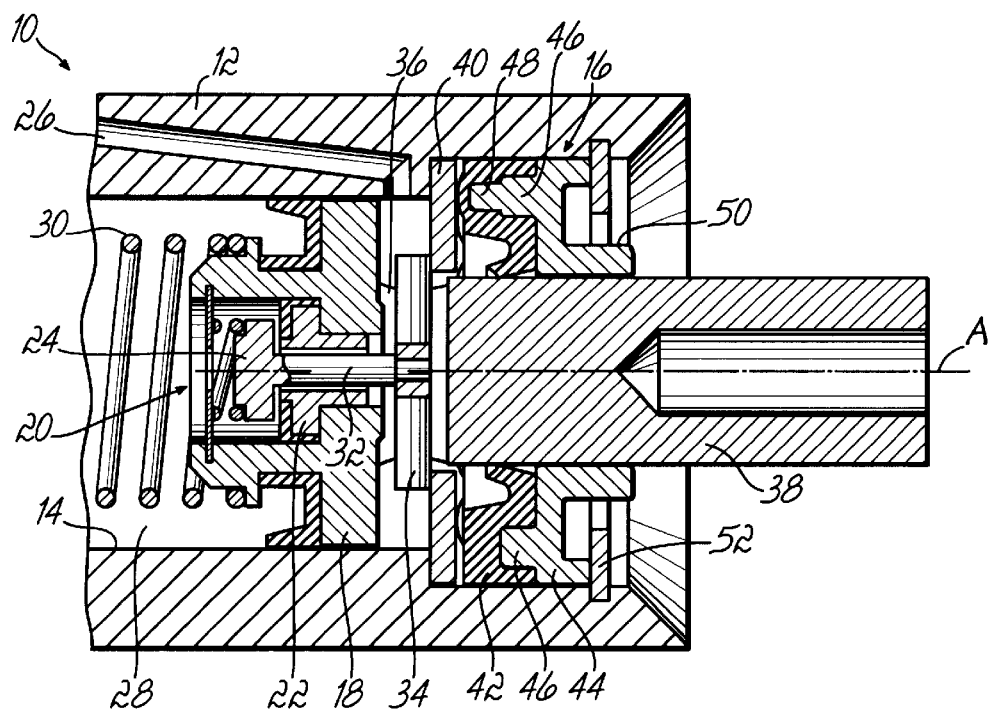

The invention relates to an annular sealing element according to the preamble of claim 1.

BACKGROUND OF THE INVENTION

Sealing elements having a rigid supporting component and an elastomer part arranged thereon are known in principle. In conjunction with valve elements, there is the problem that the point in time at which a valve opens and closes is not defined precisely since that part of the valve which, by virtue of displacement, causes the valve to be opened and closed is pushed into the elastomer material of the sealing element to a more or less pronounced extent, depending on the fluid pressure acting on it, as a result of which the point in time at which the valve opens and closes varies. This is undesirable in a large number of applications since the valve is intended to have constant, precisely defined opening and closing behavior.

U.S. Pat. No. 3,282,594 discloses a sealing element according to the preamble of claim 1. A similar sealing element is known from GB 2 256 687 A. The factor which is common to both sealing elements is that the elastomer constituent of the sealing element is injection molded in one piece with the rigid supporting body. This is intended to ensure good sealing between the elastomer material and the material of the rigid supporting body.

OBJECT OF THE INVENTION

The object of the invention is to provide an annular sealing element that [sic] is suitable for interacting with a displaceable body of a valve and, in particular, for ensuring that the opening and closing behavior of the valve is as constant as possible. Furthermore, with a view to using it in mass production, the sealing element is intended to be produced cost-effectively without the sealing function of the sealing element being adversely effected as a result.

Taking as departure point an annular sealing element of the type mentioned in the introduction, this object is achieved according to the invention in that the part made of rigid material and the part made of elastomer material are connected to one another in a releasable manner, the protrusion, which is formed on the part made of rigid material and runs around in the form of a ring, passes just more or less to the full extent in the axial direction through the part made of elastomer material, the part made of elastomer material covers over the end surface of the protrusion to the full extent, and the wall thickness $S_i$ is approximately equal to the wall thickness $S_a$. "More or less to the full extent" here means that the axial, free end of the protrusion, which is formed on the part made of rigid material and runs around in the form of a ring, is located not in the end surface of the elastomer part but rather some way beneath this, i.e. that the elastomer part, which covers over the protrusion, projects beyond the latter. The resulting, thin elastomer layer which rests on the free end of the protrusion ensures that a moveable valve body can always be positioned in a smooth and lightly damped manner on that end side of the sealing element which is directed towards it, and then, following a negligible compression phase, can be supported, virtually without delay, on the protrusion, which is formed on the part made of rigid material. The support which is achieved in this way ensures defined opening of the valve irrespective of the pressure counter to which the valve has to be opened.

The abovedescribed design of the sealing element according to the invention results in a more or less rigid stop for the displaceable valve body without the sealing function of the sealing element being impaired as a result. On the other hand, the fact that the elastomer part covers over the protrusion, which is formed on the rigid part of the sealing element, to the full extent ensures excellent sealing even under critical conditions. Since the largest radial extent of the annular protrusion is only, for instance, at most 70% of the sum of the wall thicknesses $S_i$ and $S_a$ and the wall thicknesses $S_i$ and $S_a$ are approximately equal, sufficient elastomer material for a good, even radially elastic sealing remains inside and outside the protrusion in the radial direction. The radial extent of the annular protrusion is preferably only at most approximately 50% of the sum of the wall thicknesses $S_i + S_a$.

The protrusion of the part made of rigid material, said protrusion running around in the form of a ring, may, for example, be in the form of a closed ring. It is alternatively possible for the annular protrusion to be formed by a plurality of ring segments between which space is left for connecting webs. According to a further modification, it is possible for at least the free end of the annular protrusion to be formed by a series of stud-like continuations which are spaced apart from one another, preferably uniformly, in the circumferential direction and extend in the axial direction. In the case of such an embodiment, the more or less rigid stop is formed by an annular arrangement of approximately punctiform abutment surfaces.

One configuration provides that, on its free end surface, the elastomer part has a plurality of circumferentially spaced apart, preferably dome-like elevations. Such a configuration achieves even gentler, better damped interengagement of the displaceable valve body with the sealing element since, at the start of interengagement, the valve body only comes into contact with the elastomer part at certain points, but then immediately comes up against a rapidly increasing resistance. If the protrusion, which is provided on the rigid part of the sealing element and runs around in the form of a ring, is formed by a series of stud-like continuations, the preferably dome-like elevations on the free end surface of the elastomer part are preferably arranged over the stud-like continuations, i.e. in axial extension thereof.

Irrespective of the design of the annular protrusion the radial extent of the protrusion preferably decreases towards its free end. In this case, the radial extent of the protrusion can decrease continuously or else in a stepwise manner. Reduction in the radial extent achieves an even better sealing action since, toward the free end of the protrusion, more and more elastomer material is present inside and outside said protrusion in the radial direction, this resulting in better radial compensation of the sealing element in the region of its elastomer part.

It is preferable if, on its end side which is directed away from the part made of elastomer material, that part of the sealing element which is made of rigid material has a hollow-cylindrical continuation. This continuation serves for better guidance of the displaceable piston.

In order to ensure a good sealing action of the sealing element even at relatively high pressure, that part of the sealing element which is made of rigid material is intended to have, in particular, no through-passages in the region of the surfaces by which it butts against the part made of elastomer material. Otherwise, regions of the elastomer part could, under corresponding pressure loading, be pushed into such through-passages, as a result of which the elastomer material would be missing at other sealing locations.

The annular sealing element according to the invention is particularly suitable for use in a main cylinder of a hydraulic vehicle braking system. Such a main cylinder, which is often also referred to as main braking cylinder, has a housing with a bore, which extends along a longitudinal axis and of which one end is closed off by an end wall belonging to the housing of the main cylinder and the other, opposite end is closed off by an annular sealing element. Guided in a sealing manner through the sealing element is an axially displaceable piston which is arranged concentrically with the bore and has a central valve, which permits a fluid connection between a fluid reservoir and a pressure chamber, delimited in the bore by the end wall and piston. When the piston is not actuated, the central valve is kept in the open position by an abutment component which acts on the sealing element. A main cylinder in which the annular sealing element is formed from two separate, annular and axially adjoining parts, of which the first part, which is directed towards the bore, consists of an elastomer material and the second part, which is directed away from the bore, consists of a rigid material, is known from EP 0 467 021A1.

Main cylinders of this type are used in vehicles, in particular, together with brake-pressure regulating systems, these systems nowadays often having the function both of preventing locking of the vehicle wheels during braking (so-called antilock system) and of preventing spinning of the drive wheels during acceleration, in particular, on a slippery underlying surface (so-called antiskid regulation). As has already been mentioned, when the main cylinder has not been actuated, i.e. when the piston is located in its rest or initial position, the central valve, which is arranged in the piston, is kept open by an abutment component which is connected to the central valve and is supported directly or indirectly on the facing end surface of that part of the closure element which is made of elastomer material.

The central valve is opened in that, when the piston moves back into its initial position after actuation of the main cylinder, the abutment component, which is connected to the central valve, passes into abutment with that end surface of the closure element which is directed towards the abutment component, and is supported there, which results in the central valve being opened. This means that the central valve has to be opened counter to the pressure prevailing in the pressure chamber at this point in time. During normal driving conditions, it is frequently the case that, at the point in time at which the abutment component is positioned against the closure element, there is only a slight positive pressure, if any at all, in the pressure chamber. In certain circumstances, however, it may be the case that the central valve will still have to be opened counter to a considerable positive pressure, in particular when, immediately after an antiskid regulation cycle, braking is necessary and the main cylinder is thus actuated. In such a case, the fluid pressure which has built up in the pressure chamber of the main cylinder in connection with antiskid regulation does not have the opportunity to be relieved of pressure before the immediately following braking actuation, since the additional fluid volume which has been fed to the pressure chamber for pressure build-up during the antiskid regulation cycle cannot, as a result of the immediately following braking actuation, be directed back into the fluid-storage container. Depending on the fluid pressure which still prevails in the pressure chamber, however, the point in time at which the central valve opens varies since the higher the pressure which still prevails in the pressure chamber, the deeper the abutment component, which is connected to the central valve, penetrates into the elastomer part of the closure element, and the central valve can only open when an appropriate counterforce is exerted on the abutment component by the closure element. Clear definition of the point in time at which the central valve opens in relation to the piston arranged in the bore of the main cylinder is thus not possible; instead, the central valve opens in dependence on certain operating conditions, sometimes earlier and sometimes later. For reasons of braking response behavior which is as constant as possible, this is undesirable.

Two exemplary embodiments of a sealing element according to the invention are explained in more detail hereinbelow with reference to the attached figures, in which:

BRIEF DESCRIPTION OF THE INVENTION

Figure 2:
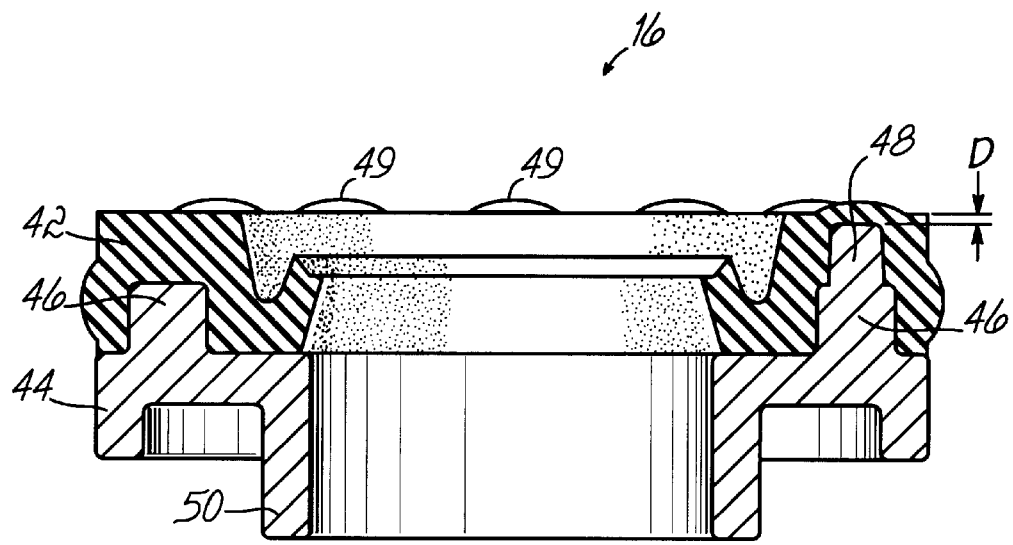
Figure 3:
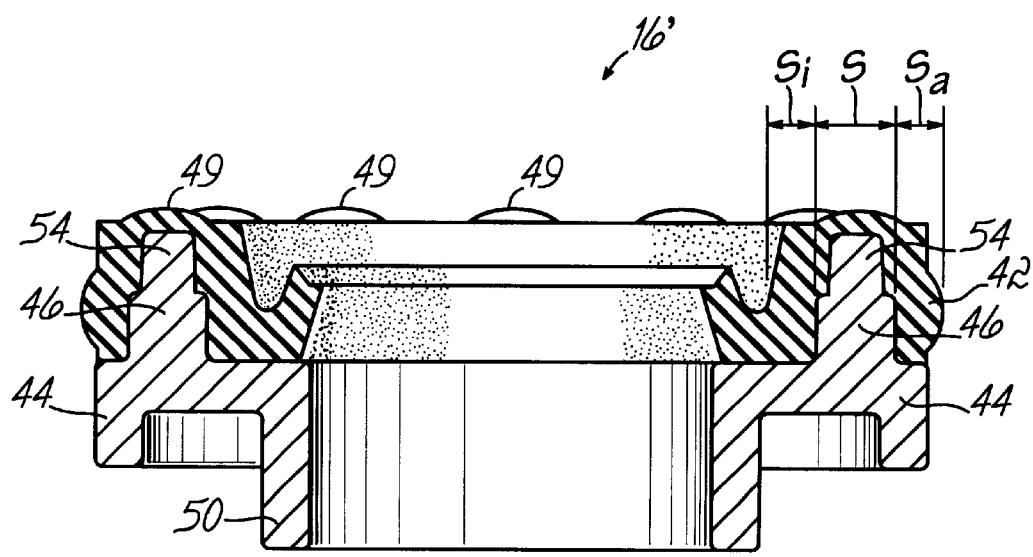

FIG. 1 shows, in an enlarged illustration, a longitudinal section through the end section of a main cylinder, use being made of a first embodiment of a sealing element according to the invention, FIG. 2 shows, in an enlarged illustration, a cross section through the sealing element used in FIG. 1, and FIG. 3, shows a view, corresponding to FIG. 2, of a sealing element which is modified with respect to FIGS. 1 and 2.

DETAILED DESCRIPTION OF THE DRAWINGS

FIG. 1 shows the force-input end of a main cylinder, which is designated in general terms by 10, for a hydraulic vehicle braking system. The main cylinder has an elongate housing 12 with a bore 14, which runs along a longitudinal axis A and, in the exemplary embodiment illustrated, is of stepped design. That end of said bore 14 which is not illustrated here is usually sealed by an end wall belonging to the housing 12 of the main cylinder 10. The other end of the bore 14, which is located opposite the end which is not illustrated is, as illustrated, sealed by a closure or sealing element 16, the design of which will be explained in more detail at a later stage in the text.

Accommodated in a sealing and axially displaceable manner in the bore 14, adjacent to the sealing element 16, is a piston 18 which can be actuated through said sealing element. A central valve 20 with a valve seat 22 and an axially moveable valve body 24, which is prestressed in a resilient manner in the direction of the valve seat 22, is arranged in the piston 18. In the open state, which is illustrated, the central valve 20 releases, via a follow-on bore 26, a fluid connection between a fluid reservoir (not shown), which is connected to the follow-on bore 26, and a pressure chamber 28, which is delimited in the bore 14 between the piston 18 and that closed-off end of the bore 14 which is not illustrated. The piston 18 is depicted in the figure in its rest or initial position, which it assumes when it is not actuated and into which it is prestressed in a conventional manner by a restoring spring 30. Those parts of the main cylinder 10 which are not illustrated are of conventional, known design and will therefore not be explained in any more detail. The piston 18 shown may have located beside it, in that part of the main cylinder 10 which is not illustrated, a second piston which is of similar design and which would then be referred to as the secondary piston.

The valve body 24 of the central valve 20 has a stud-like continuation 32 which extends through the piston 18 and at the free end of which there is fastened a transverse pin 34, which serves as abutment component. The transverse pin 34 is accommodated with play in a radial through-passage 36 of a reduced-diameter actuating continuation 38 which is connected integrally to the piston 18, extends through the sealing element 16, projects out of the housing 12 of the main cylinder 10 and is provided for connection to a rod-like input element (not illustrated). When the piston 18 assumes the rest position (illustrated), the transverse pin 34 butts against an annular stop disk 40 which, for its part, is in contact with the end surface of an elastomer part 42 belonging to the sealing element 16, with the result that the central valve 20 is kept in the open position.

In addition to the annular elastomer part 42, the sealing element 16 has an axially adjoining part 44, which is designed separately, is likewise annular and consists of rigid material, for example of a suitable, rigid plastic. On its end surface which is directed towards the elastomer part 42, the part 44 made of rigid material has an axially extending protrusion 46 which runs around said part 44 in the form of a ring, is covered over by the elastomer part 42 to the full extent and, in the example shown, tapers conically towards its free end, it being the case that, in accordance with the first embodiment, which is shown in FIGS. 1 and 2, its free end is formed by a series of stud-like continuations 48 which are spaced apart from one another uniformly in the circumferential direction and likewise extend in the axial direction. As can better be seen from FIG. 2, the axial extent of the protrusion 46 (including its continuations 48) is selected such that the elastomer part 42 has the protrusion 46 passing through it more or less to the full extent in the axial direction. There is just a thin elastomer layer of thickness D between the end surface of the elastomer part 42, which is in contact with the annular stop disk 40, and the end surface of each of the stud-like continuations 48 (see FIG. 2). As can be seen from FIG. 3, the radially inner section of the elastomer part 42, adjacent to the protrusion 46, has a radial wall thickness $S_i$, and the radially outer section of the elastomer part 42, adjacent to the protrusion 46, has a radial wall thickness $S_a$, $S_i$ and $S_a$ having approximately the same value. The largest radial extent S of the protrusion 46, which in the exemplary embodiment shown, as a result of the conical configuration of the protrusion 46, is located at the base of the latter, is in this case approximately 50% of the sum of the wall thicknesses $S_i$ and $S_a$. As can likewise be seen from FIG. 3, on the free end surface of the elastomer part 42, a series of dome-like elevations 49 are formed integrally with the elastomer part 42. Each dome-like elevation 49 is arranged precisely above one of the stud-like continuations 48 of the protrusion 46.

The parts 42 and 44 of the sealing element 16, which, on account of being designed separately, can be produced separately in a cost-effective manner, are connected to one another in a releasable manner by being joined together. The sealing element 16, of which the part 44 in the example illustrated has an integral hollow-cylindrical continuation 50 for better guidance of the actuating continuation 38, is retained by a retaining ring 52, arranged in an annular groove, in that end section of the bore 14 of the main cylinder 10 which is widened in a step-like manner.

The main cylinder 10 illustrated functions as follows: Starting from the depicted initial position of all the parts, driver-induced actuation of the braking system via the rod-like input element (not illustrated), which is connected to the actuating continuation 38 of the piston 18, has the effect of displacing the piston 18 to the left, in relation to the figure, relative to the housing 12 of the main cylinder 10. The transverse pin 34, which, when the main cylinder is not actuated, keeps the central valve 20 open, is thus released from the annular stop disk 40 and the central valve 20, which is prestressed in a resilient manner in the closing direction, closes, whereupon, as axial displacement of the piston 18 continues, fluid pressure is built up in the pressure chamber 28. During such actuation of the main cylinder 10, the sealing element 16 assumes the tasks of both sealing the bore 14 with respect to the actuating continuation 38 and guiding the latter.

The pressure-relief movement during release of the brake, accordingly, takes place in reverse order, i.e. the piston 18, under the action of the restoring spring 30, is displaced to the right in relation to the figure, and the transverse pin 34, shortly before the rest position of the piston 18 is reached, comes into abutment with the annular stop disk 40, with the result that the central valve 20 opens again and any low residual pressure which may still be present in the pressure chamber 28 is discharged, via the follow-on bore 26, into the fluid reservoir (not illustrated).

It should be assumed in the following that, just before a driver-induced braking actuation, an antiskid regulating cycle has taken place, during which an additional volume of fluid has automatically been fed to the pressure chamber 28 from the fluid reservoir in order to provide braking pressure for the purpose of reducing the wheel slip. If the driver initiates a braking actuation immediately following such an antiskid regulating cycle, the central valve 20 has to be opened counter to an, in part, considerable positive pressure at the end of the braking operation since relief of pressure in the pressure chamber 28 by return of the additional volume of fluid, fed during the antiskid regulating cycle, into the fluid reservoir was no longer possible prior to the immediately following braking actuation initiated by the driver. Depending on the size of the volume of fluid fed during the antiskid regulating cycle, a more or less high positive pressure thus still prevails in the pressure chamber 28 even when the piston 18 has returned back into its initial position again following completion of the braking actuation initiated by the driver. Even in such a case, however, the point in time at which the central valve 20 opens changes only insignificantly since, as a result of the just very low compressibility of the thin elastomer-material layer D arranged on the protrusion 46, the pressure which is transmitted to the end surface of the elastomer part 42 from the pressure chamber 28, via the transverse pin 34 and the annular stop disk 40, acts virtually without delay on the head surfaces of the stud-like continuations 48 of the protrusion 46, which is formed on the part 44. The rigid material of the part 44 does not permit any further axial displacement of the annular stop disk 40, and thus of the transverse pin 34 as well, with the result that the central valve 20 opens reliably, while maintaining a precisely defined opening point in relation to the position of the piston 18, even counter to high positive pressure.

The sealing element 16', which is shown in FIG. 3, differs from the sealing element 16, which is used in the abovedescribed, first embodiment, merely by virtue of the fact that provided instead of the stud-like continuations 48 is a single continuation 54 which is closed in the form of a ring and has smaller cross-sectional dimensioning than the part of the protrusion 46 arranged beneath it. The dome-like elevations 49 are spaced apart from one another uniformly in the circumferential direction, over the continuation 54, on the end surface of the elastomer part 42. The function of the sealing element 16' corresponds to that of the sealing element 16.

What is claimed is:

1. Annular sealing element for sealing an annular gap between the inner surface of a cylindrical wall and a cylindrical piston which can be displaced axially relative to said wall and is arranged concentrically therewith, it being the case that the annular sealing element has two annular and axially adjoining parts (42, 44), of which the first part (42) consists of an elastomer material with thickness (D) and the second part (44) consists of a rigid material, it being the case that the part (44) made of rigid material has a protrusion (46) which is formed integrally with it, runs around it in the form of a ring, projects axially into the second part (42), has a radial extent S and is designed and arranged such that a section of the second part (42) which butts against the radially inner flank of said protrusion has a radial wall thickness $S_i+S_a$, characterized in that the two parts (42, 44) are connected to one another in a releasable manner, in surface to surface contact and non-rotatable with respect to each other during use, the protrusion (46), which runs around in the form of a ring and is formed on the part (44) made of rigid material, passes substantially through the thickness (D) of the part (42) made of elastomer material in the axial direction, the part (42) made of elastomer material covers over the end surface of the protrusion (46) to the full extent, and the wall thickness $S_i$ is approximately equal to the wall thickness $S_a$.

2. Annular sealing element according to claim 1, characterized in that the radial extent S of the protrusion (46) is not more than 50% of the sum of the wall thicknesses $S_i+S_a$.

3. Annular sealing element according to claim 1, characterized in that, on its end surface, the part (42) made of elastomer material has a plurality of circumferentially spaced-apart, dome-like elevations (49).

4. Annular sealing element according to claim 1, characterized in that the radial extent S of the protrusion (46) decreases toward the free end of the latter.

5. Annular sealing element according to claim 4, characterized in that the decrease in the radial extent S of the protrusion (46) takes place continuously or in a stepwise manner.

6. Annular sealing element according to claim 1, characterized in that the free end of the protrusion (46) is formed by a series of stud-like continuations (48) which are spaced apart from one another preferably uniformly in the circumferential direction and extend in the axial direction.

7. Annular sealing element according to claim 6, characterized in that the dome-like elevations (49) are arranged in axial extension of the stud-like continuations (48).

8. Annular sealing element according to claim 1, characterized in that, on its end side which is directed away from the part (42) made of elastomer material, the part (44) made of rigid material has a hollow-cylindrical continuation (50).

9. Main cylinder (10) for a hydraulic vehicle braking system, having a housing (12) which has a bore (14), which extends along a longitudinal axis (A) and of which one end is sealed by an end wall belonging to the housing (12) of the main cylinder (10) and the other, opposite end is sealed by a closure element (16), it being the case that accommodated in a sealing and axially displaceable manner in the bore (14), adjacent to the closure element (16), is a piston (18) which can be actuated through said closure element and has a central valve (20), which permits a fluid connection between a fluid reservoir and a pressure chamber (28), delimited in the bore (14) by the end wall and piston (18), and which, when the piston (18) is not actuated, is kept in the open position by an abutment component (transverse pin 34) which acts on the closure element (16), characterized in that the closure element (16) includes two annular and axially adjoining parts (42, 44) connected to one another in a releasable manner, the first part (42) consists of an elastomer material with thickness (D) and the second part (44) consists of a rigid material having a protrusion (46) which is formed integrally with the second part (44) and running around it in the form of a ring, projecting axially into the second part (42), wherein the second part (42) has a radial extent S and is designed and arranged such that a section of the second part (42) which butts against the radially inner flank of said protrusion has a radial wall thickness $S_i$ and that section of the second part (42) which butts against the radially outer flank of said protrusion has a radial wall thickness $S_a$, and the radial extent S of the protrusion (46) is not more than 70 percent of the sum of the wall thicknesses $S_i+S_a$, the protrusion (46) which runs around in the form of a ring and is formed on the part (44) made of rigid material, passes substantially through the thickness (D) of the part (42) made of elastomer material in the axial direction, the part (42) made of elastomer material covers over the end surface of the protrusion (46) to the full extent, and the wall thickness $S_i$ is approximately equal to the wall thickness $S_a$, the parts (42 and 44) being in surface to surface contact, and non-rotatable with respect to each other during use.

* * * * *

UNITED STATES PATENT AND TRADEMARK OFFICE
CERTIFICATE OF CORRECTION

PATENT NO. : 6,203,022 B1
DATED : March 20, 2001
INVENTOR(S) : Martin Struschka and Ulrich Beier It is certified that error appears in the above-identified patent and that said Letters Patent is hereby corrected as shown below:

Column 1,
Line 39, reads "effected" and should read -- affected --.

Column 2,
Line 1, reads "abovedescribed" and should read -- above-described --.

Column 4,
Line 36, reads "The other end of the bore 14, which is located opposite the end which is not illustrated is, as illustrated, sealed by …" and should read Signed and Sealed this Fourth Day of March, 2003

JAMES E. ROGAN
*Director of the United States Patent and Trademark Office*